UNITED STATES PATENT OFFICE.

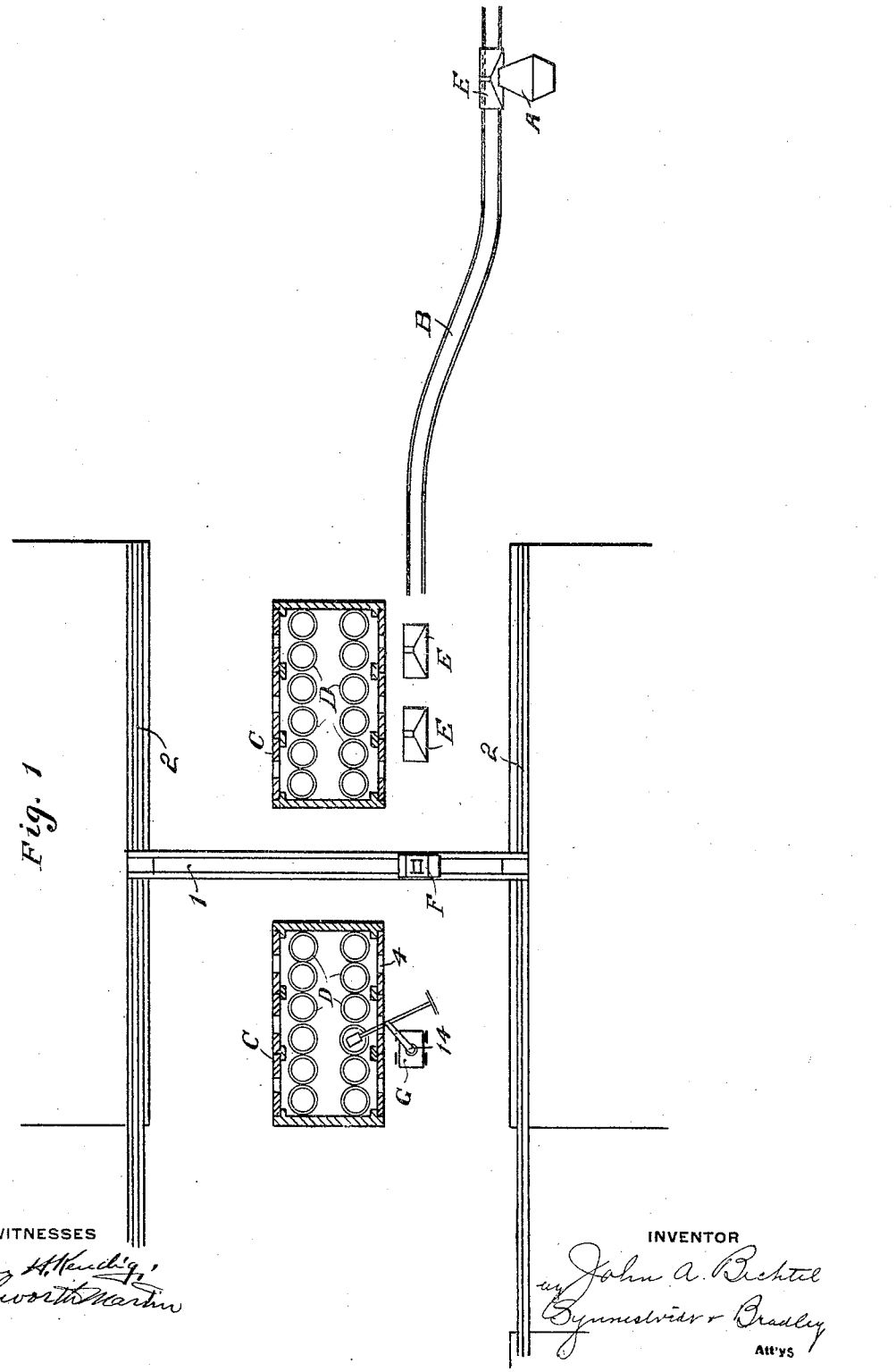

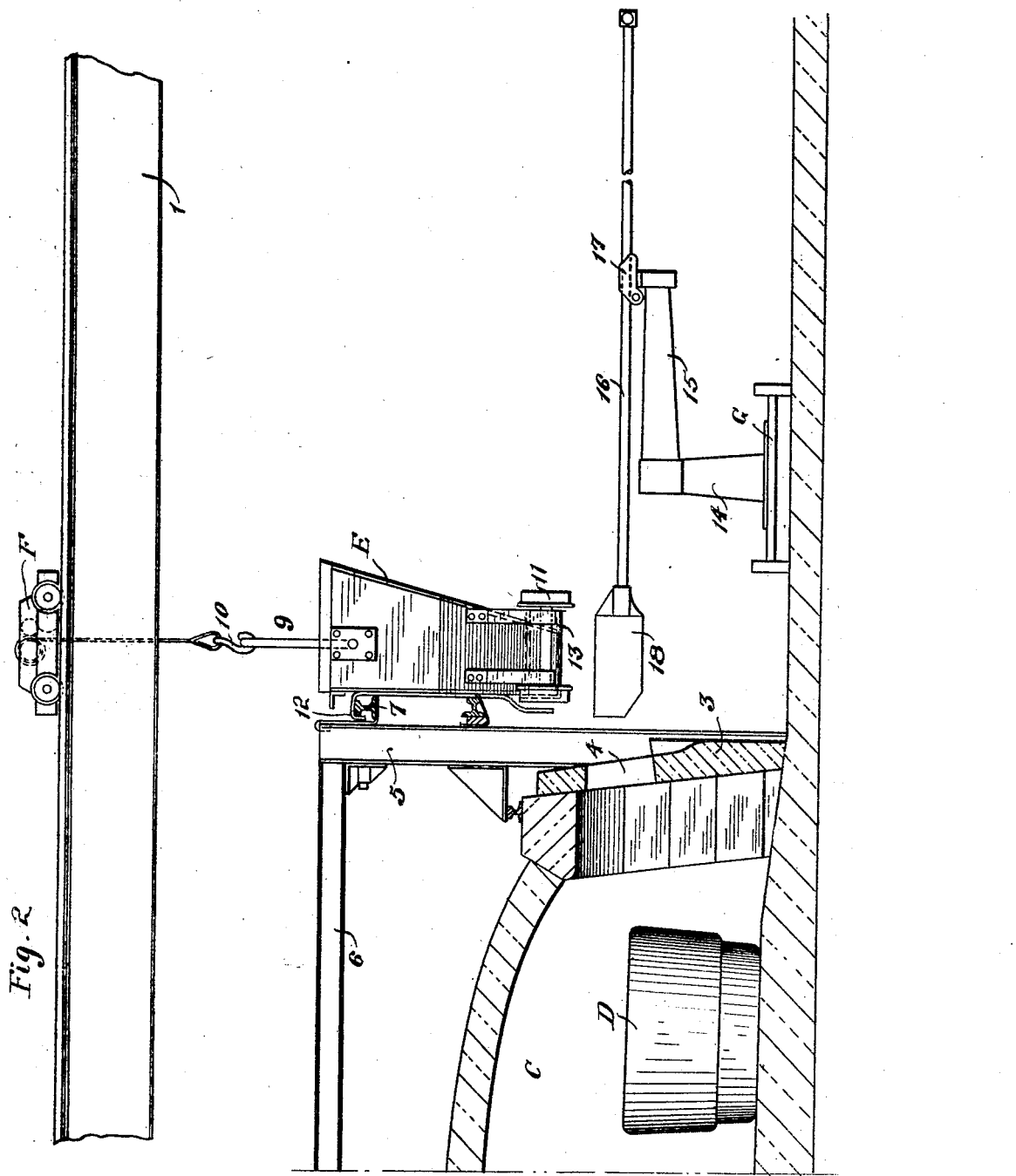

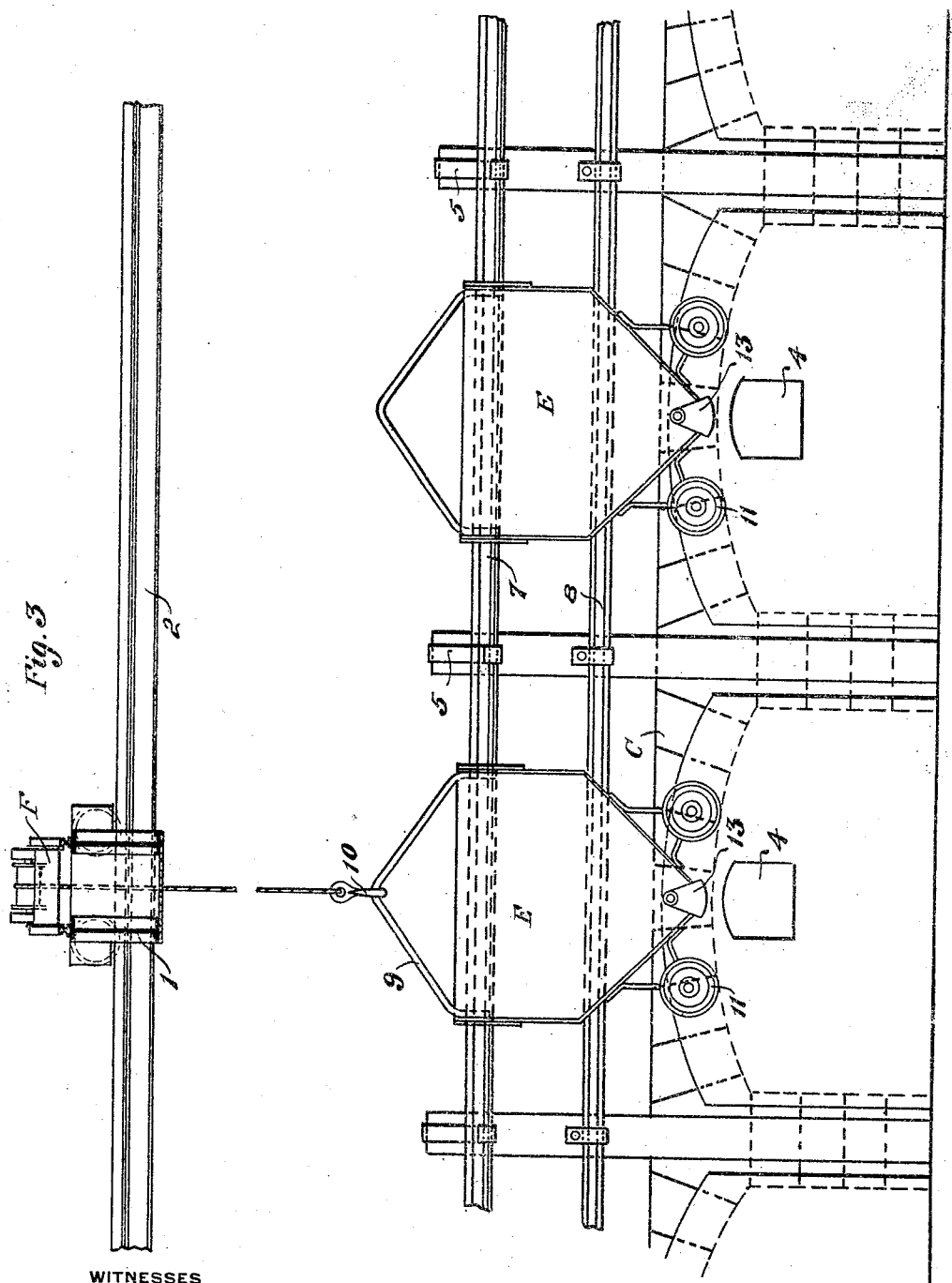

JOHN A. BECHTEL, OF TARENTUM, PENNSYLVANIA, ASSIGNOR TO PITTSBURGH PLATE GLASS COMPANY, A CORPORATION OF PENNSYLVANIA.

GLASS-MATERIAL-HANDLING APPARATUS.

1,111,558.   Specification of Letters Patent.   Patented Sept. 22, 1914.

Application filed July 8, 1913. Serial No. 777,859.

*To all whom it may concern:*

Be it known that I, JOHN A. BECHTEL, a citizen of the United States, residing at Tarentum, in the county of Allegheny and State of Pennsylvania, have invented certain new and useful Improvements in Glass-Material-Handling Apparatus, of which the following is a specification.

The invention relates to apparatus for supplying the materials employed in the manufacture of plate glass to the pots of a melting furnace. The invention has for its primary objects the following: (1) the provision of an apparatus which can be operated by a minimum number of workmen, and without exposure to excessive heat; (2) the provision of an apparatus whereby the amount of batch supplied to the pots may be accurately measured, and (3) the provision of an apparatus which can be manipulated without loss of time and which leaves the space above the furnace free for the carrying on of other operations involving the use of the overhead crane. One embodiment of the invention is illustrated in the accompanying drawings wherein—

Fig. 1 is a diagrammatic plan view with the furnaces in section, Fig. 2 is a side elevation of the material handling apparatus, with the furnace in cross section, and Fig. 3 is a front elevation of the furnace, showing the filling hoppers in operative position.

The apparatus of the present application constitutes a modification and improvement over that shown in my copending application serial No. 777,860 and entitled "Process of handling materials for glass making." The process set forth in the said copending application may be carried out by the apparatus shown in the present application, and the apparatus disclosed in said copending application constitutes a modification of the broad invention as set forth and claimed in the present application. The process as carried out by the apparatus of the present application (and claimed in my copending application No. 777,858), has all the advantages set forth for the process of the copending application, and the apparatus of this application has certain advantages over that disclosed in the said copending case. One of the primary advantages of the present apparatus as compared with that of the other application resides in the fact that the hoppers, instead of being supported by the crane during the filling operation, are supported upon the framework of the furnace, after having been moved to such position by the crane. This leaves the crane free for other work, and by having a plurality of hoppers always in position no time need be lost while one hopper is being moved into operative position, or another hopper after discharge is moved to inoperative position. Another advantage incident to this apparatus as compared to the apparatus of the copending application results from the fact that the space above the hoppers is left free for the action of the overhead crane, so that the crane may move along over the furnace, carrying pots to and from pouring position, without interference with the hoppers or with the charging operation carried on in connection with such hoppers.

Briefly stated, the apparatus comprises in connection with the glass melting furnace, a series of portable gravity discharge receptacles or hoppers, a crane for moving these hoppers to a position above the charging doors of the furnace, and means whereby the portable hoppers may be supported in the positions to which they are carried by the crane. The hoppers are preferably provided with wheels so that they may be wheeled from the batch house to a position adjacent the furnace before engagement with the crane, and the wheels are preferably formed so that they may operate either upon rails or upon the floor of the furnace, it being desirable in some cases to utilize a track for bringing the hoppers from the batch house to a point in proximity to the furnace. The hoppers discharge by gravity into a ladle supported for movement in and out of the furnace, the ladle in one position being beneath the discharge opening of the hopper, and in another position being over the top of one of the pots to be filled.

Referring first to the general arrangement as shown in Fig. 1: A is the mixer in which the batch is mixed; B is a track leading from the mixer to a point adjacent the furnaces; C C are glass melting furnaces of the usual type containing a plurality of pots; D; E E E are gravity discharge hoppers for conveying the batch from the mixer A to the furnaces; F is an overhead crane for handling the hoppers E; and G is a truck carrying the ladle for transferring the material from the hoppers E to the pots in the furnace.

By reference to both Figs. 1 and 2 it will be noted that the crane F is mounted for movement along a crane girder 1, and that this crane girder 1 is in turn mounted for movement along the rails 2—2 (Fig. 1), so that it can be moved to any desired position with respect to the furnaces.

The furnaces C are constructed in the usual manner, having the movable front walls 3 to permit of the removal of the pots D from the furnace, the movable walls 3 being provided with charging doors 4. The furnace structure also includes the usual stays 5 and 6, the stays 5 being provided along the front with the rails 7 and 8 upon which the hoppers E are detachably mounted.

The hoppers E are preferably of the form indicated in Figs. 2 and 3, and are provided with the bails 9 for engaging the hook 10 of the crane, and with the wheels 11. The wheels of the hoppers run upon the track B (Fig. 1) until a point is reached adjacent to the furnaces, when they are run off the track and wheeled to convenient positions with respect to the front of the furnaces C C. The hoppers are then lifted to the positions indicated in Figs. 2 and 3 and hung upon the rails 7, with the lower portion of the hoppers resting against the rails 8. The hoppers are secured to the rails 7 by means of the hooks 12 so formed that the hopper is disengaged by lifting it and moving it laterally. Each of the hoppers is provided with an outlet valve 13 for governing the gravity discharge, and the hoppers are preferably mounted directly over the charging doors 4 as indicated in Fig. 3, so that the charging ladle to be later described need be moved only a short distance in transferring the batch from the hopper to the pots in the furnace.

The truck G is provided with an upright post 14 upon the upper end of which is mounted the horizontally swinging arm 15. The free end of the arm 15 carries the handle 16 of the ladle, such handle being mounted upon the end of the arm 15 for swinging horizontal movement. The handle is also mounted in the bracket 17 so as to rotate about its axis to permit the dumping of the ladle after it is positioned above the pots D. The ladle 18 which is carried at the forward end of the handle 16 is of relatively small capacity as compared to the capacity of the pots D, the relative capacity being such that about ten charges of the ladle are required in order to give the pot D its first fill. The various pots in the furnace require different quantities of batch, depending upon their location, and the ladle 18 having a relatively small capacity constitutes an accurate measuring device for supplying these pots with precisely the quantity of batch required. The handle 16 of the ladle is preferably pivoted in the bracket 17 in such manner that the ladle cannot move downward below the position indicated in Fig. 2. This arrangement relieves the operator from the labor of supporting the ladle, and also avoids the danger of striking the pot with the ladle, such as might occur if the ladle could swing downward after its insertion into the furnace. As indicated in Fig. 1, the truck is preferably located with the post 14 to one side of the centerline of the charging door, in which position the ladle is easier of manipulation than if the post 14 were in alinement with the centerline of the door.

In operation the hoppers are filled at the mixer A and moved along the track B to a point adjacent the furnaces C, after which they are moved off the track and wheeled to convenient positions adjacent the fronts of the furnaces C. They are then lifted by the crane F and put in position upon the rails 7 as indicated in Figs. 1 and 2, a hopper being supported above each of the charging doors 4. The hoppers each preferably contain sufficient batch for the first fill of two of the pots, and the pots are preferably so arranged that two may be filled through each of the charging doors.

The advantages incident to the apparatus will be readily apparent to those skilled in the art. While the contents of one of the hoppers is being supplied to the furnace, another hopper can be positioned by the crane, so that the hoppers are always filled and ready for use, and no loss of time occurs, the crane being free to perform its work of positioning the hoppers, by reason of the fact that the hoppers when once positioned are supported independently of the crane, thus differing from the apparatus of my copending application heretofore referred to wherein the hoppers are supported by the crane from the time they are lifted until they are discharged and returned to the floor. The supporting of the hoppers upon the framework of the furnace instead of by the crane, is also of advantage in that it leaves the head room above the furnace and the hoppers free, so that the crane can be moved back and forth for the performance of other functions such as the carrying of the pots to and from the furnace in the casting operations after the fronts 3 have been removed. Practically no dust is raised by the operation, and the work is made very easy for the operators, as they can work at a point far removed from the front of the furnace, thus relieving them from the excessive heat conditions incident to the ordinary procedure involved in charging a glass furnace. The operation of filling the pots can be carried on with exactness, since the ladle constitutes a measuring device. The supplying of the batch to the pots in relatively small quantities facilitates the melting operation, since each unit of batch is exposed to the reflected heat from the crown of the furnace before another unit of batch is supplied on top of it. The batch in the pot is thus heated uniformly throughout to a high degree by the time the pot is filled. Other advantages incident to the use of the apparatus are set forth in my copending application and will be readily apparent to those skilled in the art.

What I claim is:

1. In combination with a glass furnace having a plurality of charging openings through its sides, portable gravity discharge hoppers removably supported upon fixed supporting means above the said openings, elevating means for moving the hoppers to and from the said supporting means, a truck movable longitudinally of the furnace past the said openings, a horizontally swinging arm carried by the truck, and a pot filling ladle carried by the said arm, the said ladle being movable upon the said arm from receiving positions beneath the hoppers to discharging positions in the furnace.

2. In combination with a glass furnace having a charging opening through its side, fixed supporting means above the charging opening, a portable gravity discharge hopper removably supported upon said fixed supporting means above the discharge opening, elevating means for moving the hopper to and from such supporting means, and a pot filling ladle mounted for movement from a receiving position beneath the gravity discharge of the hopper to a discharging position in the furnace.

3. In combination with a glass furnace having charging openings through its side and provided with melting pots, fixed supporting means above the opening, wheeled gravity discharge hoppers removably supported upon the said fixed supporting means, elevating means for moving the hoppers to and from the fixed supporting means, and a portable charging device movable longitudinally of the furnace and provided with a ladle mounted for reciprocation from receiving positions beneath the hoppers to discharging positions over the pots of the furnace.

In testimony whereof I have hereunto signed my name in the presence of the two subscribed witnesses.

JOHN A. BECHTEL.

Witnesses:
ARCHWORTH MARTIN,
L. A. MYERS.